United States Patent [19]
Theobald

[11] Patent Number: 6,161,857
[45] Date of Patent: Dec. 19, 2000

[54] STEERABLE AXLE SPRING SUSPENSION FOR A TWO-WHEELER

[75] Inventor: Markus Theobald, Munich, Germany

[73] Assignee: Bayerische Motoren Werke Aktiengesellschaft, Munich, Germany

[21] Appl. No.: 09/109,939

[22] Filed: Jul. 2, 1998

[30] Foreign Application Priority Data

Aug. 28, 1997 [DE] Germany .............................. 197 37 599

[51] Int. Cl.$^7$ ...................................................... B62K 1/00
[52] U.S. Cl. ............................................................. 280/276
[58] Field of Search ................................. 280/275, 276, 280/283; 180/219

[56] References Cited

U.S. PATENT DOCUMENTS

| 5,209,319 | 5/1993 | Buell . | |
|---|---|---|---|
| 5,782,313 | 7/1998 | Kurawaki | 180/219 |

FOREIGN PATENT DOCUMENTS

| 817 252 | 10/1951 | Germany . |
|---|---|---|
| 899 444 | 12/1953 | Germany . |
| 937 574 | 1/1956 | Germany . |
| 66 06 862 | 11/1966 | Germany . |
| 1 680 564 | 9/1970 | Germany . |
| 36 23 567 C2 | 1/1989 | Germany . |
| 40 13 808 A1 | 10/1991 | Germany . |
| 295 15 849 U1 | 1/1996 | Germany . |
| 195 12 641 | 10/1996 | Germany . |
| 4-193693 | 7/1992 | Japan . |

*Primary Examiner*—Christopher P. Schwartz
*Assistant Examiner*—C. T. Bartz
*Attorney, Agent, or Firm*—Evenson, McKeown, Edwards & Lenahan, P.L.L.C.

[57] ABSTRACT

A steerable axle spring suspension for a two-wheeler has a sliding tube and at least one longitudinal control arm which, swivellably about a transverse axis of the vehicle, is fixedly mounted on the vehicle frame. The sliding tube and the longitudinal control arm are connected with one another by a joint. The sliding tube is an axle-receiving device for receiving a wheel axle and a tube which is fixedly connected with and lengthens the axle-receiving device.

16 Claims, 3 Drawing Sheets

STEERABLE AXLE SPRING SUSPENSION FOR A TWO-WHEELER

BACKGROUND OF THE INVENTION

This application claims the priority of German application 197 37 599.5, filed Aug. 28, 1997, the disclosure of which is expressly incorporated by reference herein.

The present invention relates to a steerable axle spring suspension for a two-wheeler having at least one sliding tube and having at least one longitudinal control arm which is mounted to be swivellable about a transverse axis of the vehicle and which is connected with the sliding tube by way of at least one joint.

It is known to guide a front wheel of a two-wheeler in a front wheel fork which, in turn, in a telescopically compressible manner, is steerably connected with the vehicle frame by a longitudinal control arm which, swivellably about a transverse axis of the vehicle, is fixedly mounted on the vehicle frame. German Registered Utility Model G 94 07 208 U1 describes such an axle suspension in which case the two fork struts of the front wheel fork are, in addition, slidably in the longitudinal direction, guided in an upper fork bridge. In such a known construction, the fork struts of the front wheel fork have a very long construction and can therefore not be constructed easily and at reasonable cost.

Particularly if the fork struts of the front wheel fork are constructed as sliding tubes, which are telescopically slidably guided by vertical tubes, the bores in the sliding tubes must be constructed to be very deep in order to obtain sufficiently large spring paths. The sliding surfaces between the vertical tube and the sliding tube must be very carefully machined at high expenditures to obtain a good response behavior of the spring suspension.

In addition, a very robust and heavy construction of the front wheel fork is required if its deformation contributes to the reduction of the kinetic energy of the vehicle. If the fork struts of the front wheel fork are dimensioned to be very strong for this purpose and are therefore heavy, however, an undesirable increase of the moments of inertia about the front axle results as well as an enlargement of the unsprung masses which impairs the driving dynamics of the vehicle.

SUMMARY OF THE INVENTION

An object of the present invention to provide an axle suspension for a two-wheeler which is reasonable in price and easy to manufacture.

According to the present invention, this object has been achieved by constructing the sliding tube of an axle receiving device for receiving a wheel axle and of a tube, the tube being fixedly connected with the axle receiving device and lengthening it.

If a steerable axle spring suspension for a two-wheeler having at least one sliding tube and at least one longitudinal control arm which, swivellably about a transverse axis of the vehicle, is fixedly mounted on the vehicle frame, the sliding tube and the longitudinal control arm being connected with one another by a joint, is constructed of several parts. This arrangement has the advantage that its machining is easier and less expensive, and the materials for each part can be selected to meet the respective demands.

In addition, the individual parts of the constructed sliding tube according to the present invention can be dimensioned such that the strength of the sliding tube at the required points is increased by their interaction. Such interaction of the individual parts according to the load also applies to the deforming behavior of the sliding tube for kinetic energy reduction.

In one preferred embodiment of the present invention, the tube projects into the axle receiving device, particularly while forming a press fit, a glued connection and/or a screwed connection. The distance between the joint and the wheel axle projected onto the longitudinal axis of the sliding tube is larger than the distance between the axle-receiving-device-side end of the tube and the wheel axle.

This preferred arrangement has the advantage that, in comparison to the tube, the axle receiving device is short, and the deforming behavior of the sliding tube can be determined by the length of the axle receiving device and the length of the overlapping of the axle receiving device and the tube.

In another preferred embodiment of the present invention, the wall thickness of the tube outside the axle receiving device is weakened at least at one point along at least a portion of its circumference, particularly by way of a notch or a groove. This is advantageous for defining a favorable deforming area for the front wheel fork, at which, for example, a high kinetic energy reduction is ensured. This is caused by the interactions with other components during the deformation.

It is very advantageous for the wall thickness of the tube to be weakened in the proximity of the connection of the longitudinal control arm and the sliding tube. In the event of a load in the longitudinal direction of the vehicle, the highest bending moment will occur at this joint. Thus, by weakening the wall thickness, for example, a notch effect, a soft response behavior can be achieved at this point by deformation for the kinetic energy reduction.

In particular, if two built-up sliding tubes receive the wheel axle and are connected by at least one fork bridge on which the longitudinal control arm is mounted, the deformation behavior of the fork bridge and of the longitudinal control arm can also be used very advantageously for the reduction of kinetic energy by deformation.

A simple stable construction is achieved with the present invention in that the fork bridge connects the axle receiving devices. Thereby, the tube is reinforced in the area of the highest bending moment by way of the axle receiving device and the fork bridge. This can take place in a particularly simple manner if the fork bridge is placed from above on the axle receiving devices and is fastened thereto. For this purpose, the axle receiving devices must only be machined on top which permits a very low-cost manufacturing of the sliding tubes.

In an advantageous construction of the present invention, the fork bridge connects the tubes of the built-up sliding tubes. Independently of the wheel diameter, the axle receiving device can have a very short construction. Consequently, the tubes can extend through the fork bridge almost to the wheel axle to permit a configuration of the axle receiving device of reasonable cost.

Particularly if the fork bridge is fastened to the axle receiving devices, it may consist of plane steel plate or of a steel section, at very low cost and corresponding to the demands. The use of steel for the fork bridge has the advantage that it can reduce a particularly large amount of kinetic energy by deformation. If the fork bridge has a U-shaped construction and if one leg respectively of the U-shaped fork bridge is fastened to one sliding tube, a deformation of the fork bridge is ensured which meets the demands particularly well.

In another advantageous embodiment of the present invention, the sliding tube is telescopically slidably guided on a vertical tube, and the vertical tube extends in the direction of the axle receiving device at least beyond the connection of the longitudinal control arm with the sliding tube. If, viewed in the direction of the axle receiving device, the vertical tube in the sliding tube extends beyond the joint, during the reduction of kinetic energy, the sliding tube and the vertical tube will deform together. A particularly large energy reduction is thus permitted because the vertical tube as well as the sliding tube absorb deformation energy.

If, in a further advantageous construction of the present invention, the axle receiving device is constructed as a forged metal part, a cast metal part or a cast light-metal part, a low-cost manufacturing will meet the demands even if the shaping is complicated. It is particularly advantageous for the energy reduction by deformation if the tube of the sliding tube consists of steel or of an extruded light-metal profile.

Another preferred embodiment of the invention fixedly mounts a deformation element on the vehicle frame above the longitudinal control arm. Such a deformation element is used, in addition to the axle suspension, for reducing energy by deformation. If this deformation element extends above the fork bridge, starting from the vehicle frame, toward the front, the tilt resistance of the vehicle is increased in the event of a frontal impact.

BRIEF DESCRIPTION OF THE DRAWINGS

Other objects, advantages and novel features of the present invention will become apparent from the following detailed description of the invention when considered in conjunction with the accompanying drawings wherein.

DETAILED DESCRIPTION OF THE DRAWINGS

Figure 1:
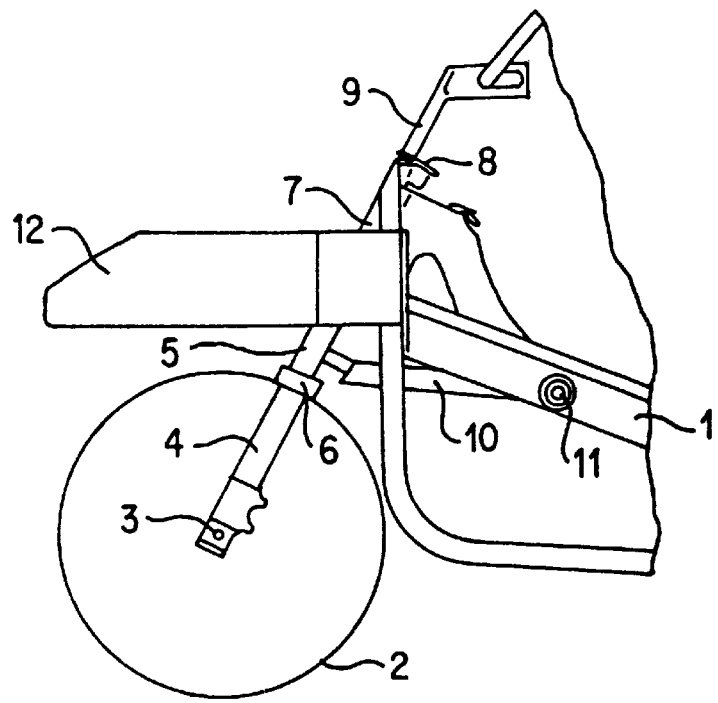
FIG. 1 is a schematic, partial side view of the forward area of a two-wheeler to which the present invention is applied.

In FIG. 1, a two-wheeler with a vehicle frame 1 has a steerable axle spring suspension for a front wheel 2 in which a wheel axle 3 is guided by an axle receiving device 4. The axle receiving device 4 is the lower portion of a sliding tube whose upper portion is formed by a tube 5. The receiving device 4 and the tube 5 are fixedly connected with one another.

Both sliding tubes 5, i.e. on the left and on the right of the front wheel 2, are connected with one another above the front wheel 2 by a fork bridge 6 and, together with the front wheel 2, form the unsprung portion of the front axle suspension.

One vertical tube 7 respectively is slidably guided in a telescopically displaceable manner in each sliding tube 5, and both vertical tubes 7, which are connected by an upper fork bridge 8, form the connection to the vehicle frame 1 and to a steering device 9.

The unsprung portion of the axle suspension is supported on the vehicle frame 1 by a longitudinal control arm 10. For this purpose, a spring system can be mounted between the longitudinal control arm 10 and the vehicle frame 1 and may be supplemented by a damper. The longitudinal control arm 10 is linked with its one end to the vehicle frame 1 so that it can be swivelled about a transverse axis 11 of the vehicle, and its other end is mounted on the fork bridge 6 by a joint, such as a ball-and-socket joint. The spring and the longitudinal control arm 10 support the unsprung portion of the axle suspension on the vehicle frame 1. As a result, the vehicle frame 1 and the steering device 9 are guided by the vertical tubes 7 in a telescopically compressible manner in the sliding tubes.

Above the front wheel 2, a deformation element 12 is mounted on the vehicle frame 1 for the reduction of kinetic energy by deformation in the event of a frontal impact. Not only the deformation element 12 will absorb kinetic energy, however, but a large amount of kinetic energy is reduced by the deformation of the front wheel fork consisting of the sliding tubes 5, the vertical tubes 7 and the fork bridges 6, 8. For this purpose, it is advantageous for the front wheel fork and the elements guiding it, such as the longitudinal control arm 10, to be constructed according to the demands for the reduction of kinetic energy by deformation.

Figure 2:
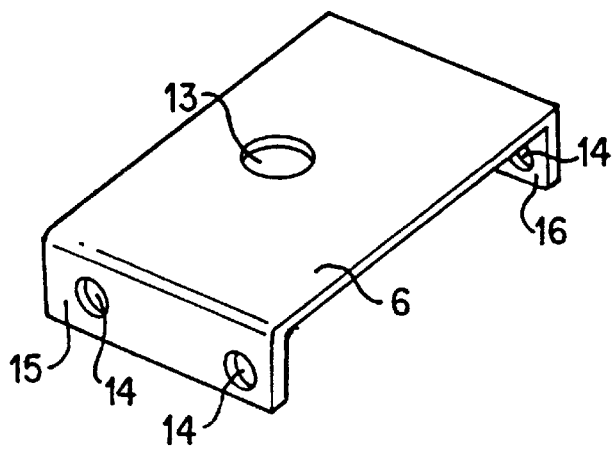
FIG. 2 is a perspective view of a fork bridge according to a preferred embodiment for a two-wheeler of the present invention.
Figure 3:
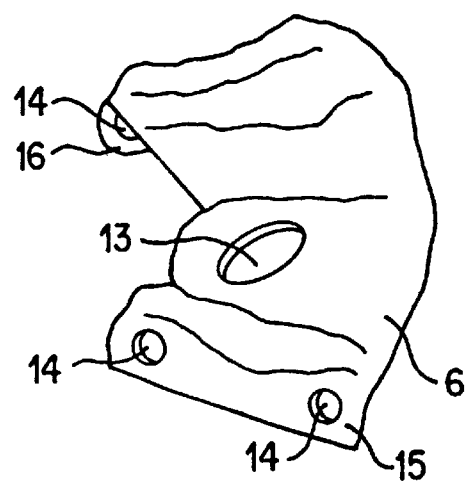
FIG. 3 is a perspective view of the fork bridge of FIG. 2 but in a deformed condition.

FIGS. 2 and 3 illustrate an example of a construction of a component of the steerable axle suspension which meets such demands. The fork bridge 6 made of sectional steel has a U-shaped construction and has a bore 13 for receiving the ball-and-socket joint for the support by the longitudinal control arm 10. Bores 14 mount one leg 15, 16 respectively of the U-shaped fork bridge 6 is mounted on one sliding tube 5, respectively.

FIG. 3 shows the fork bridge 6 in the deformed condition after a frontal impact. The deformation of the steel section reduces a large amount of energy in the fork bridge 6. Simultaneously with the fork bridge 6, the longitudinal control arm 10 (FIG. 1) is deformed which, therefore, also reduces kinetic energy. Because the deformation element 12 (FIG. 1) is mounted above the center of gravity of the two-wheeler, it prevents the tilting of the two-wheeler by supporting the vehicle frame 1 in the event of an impact, also while reducing kinetic energy by deformation.

Figure 4:
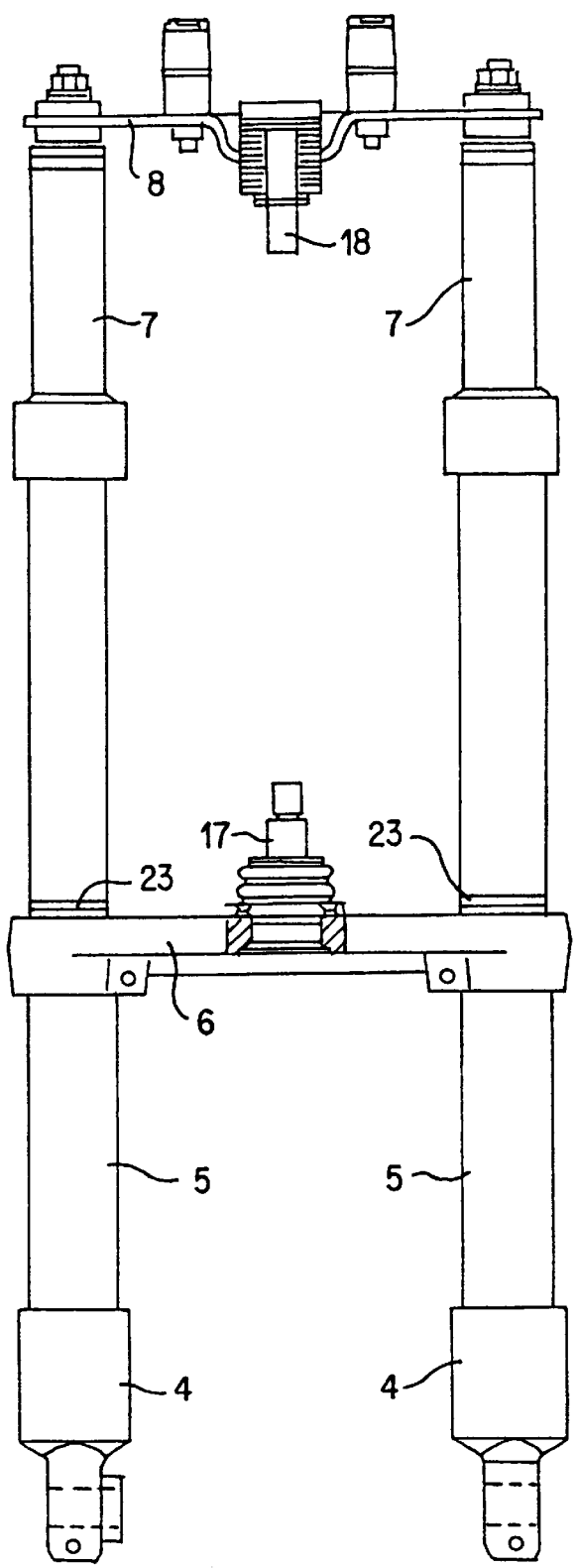
FIG. 4 is a front view of a front wheel fork of the present invention.

FIG. 4 is a detailed view of the front wheel fork. Each of the sliding tubes on the left and on the right of the front wheel 2 include one axle receiving device 4 made of a light-metal casting, into which one tube 5 respectively is pressed. A secure connection of the axle receiving device 4 and the tube 5 is achieved, in addition, by gluing them together at the point at which they project into one another in an overlapping manner. At a distance from the axle receiving devices 4 above the front wheel 2, the fork bridge 6, which is clamped to the axle receiving devices 4, connects the two tubes 5. The fork bridge 6 has a stud bolt 17 on which the joint of the connection to the longitudinal control arm 10 is mounted. The tubes 5 of the sliding tube are steel tubes which are guided in a telescopically displaceable manner by way of the vertical tubes 7. The vertical tubes 7 are fastened to the vehicle frame 1 (FIG. 1) while being connected by the upper fork bridge 8 and being rotatable by way of a pivot 18.

Figure 5:
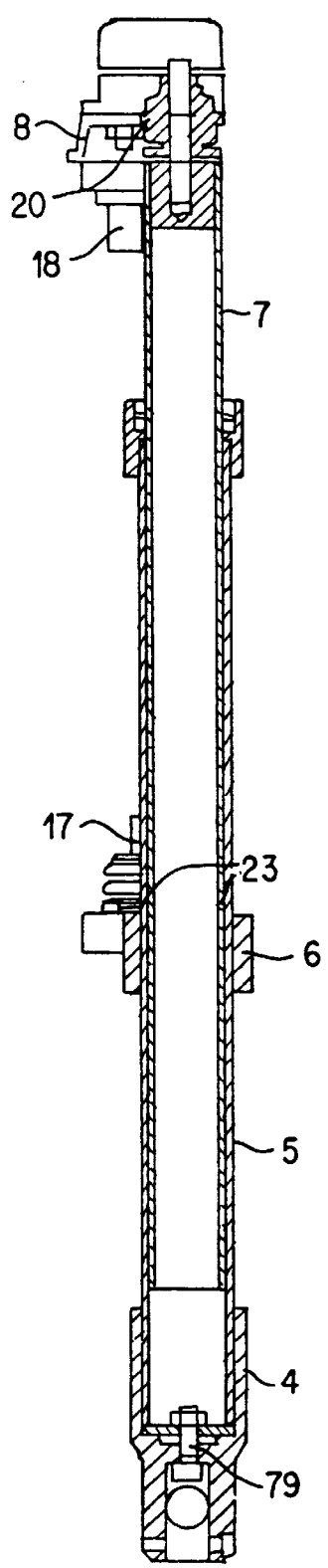
FIG. 5 is a sectional view of a fork strut of the front wheel fork of FIG. 4.

FIG. 5 shows the built-up sliding tube consisting of the axle suspension 4 and the tube 5 of FIG. 4. The tube 5 is fitted into the axle receiving device 4 and is screwed thereto by a screw 19. The vertical tube 7, which extends in the direction of the axle receiving device 4 to beyond the stud bolt 17, is telescopically displaceably guided in the tube 5 so that, in the event of a deformation, the sliding tube and the vertical tube 7 reduce kinetic energy by deformation. The vertical tubes 7 are disposed in the upper fork bridge 8 by way of ball-and-socket joints 20 so that the swivelling motion forced by the longitudinal control arm 10 can be carried out during its movement about the transverse axis 11 of the vehicle.

The wall thickness of the tube 5 outside the axle receiving device 4 is weakened along its circumference by a groove 23, specifically in the proximity of the connection of the longitudinal control arm 10 and the sliding tube, and slightly above the fork bridge 6. The groove 23 forms a desired buckling point in the proximity of the point with the largest bending moment in the event of a frontal impact. If the groove 23 is situated above the fork bridge 6, in the event of a shearing-off of the front wheel fork by the impact, the front wheel 2 with the front wheel fork parts remaining on it is held by the longitudinal control arm 10 on the vehicle frame 1 and prevents the sheared-off vehicle parts from being thrown off.

Figure 6:
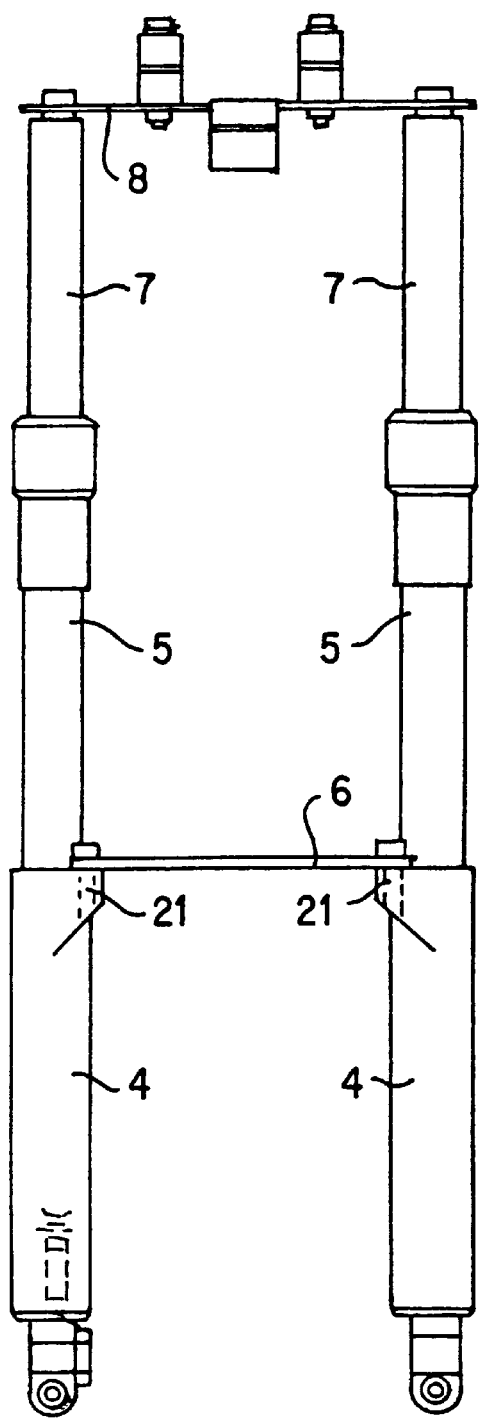
FIG. 6 is a front view of another front wheel fork according to the present invention.

FIG. 6 is a front view of another front wheel fork. In the case of this front wheel fork, a fork bridge 6 made of steel plate is placed from above on the axle receiving devices 4 of the sliding tubes and is screwed thereon by screws 21. The tubes 5 made of steel are connected in an inserted manner with the axle receiving devices 4 by a press fit which is also glued and lengthen the axle receiving devices 4 in the upward direction. In each sliding tube built up in this manner, a vertical tube 7 is telescopically compressibly guided, in which the vertical tubes 7 are connected by an upper fork bridge 8.

Figure 7:
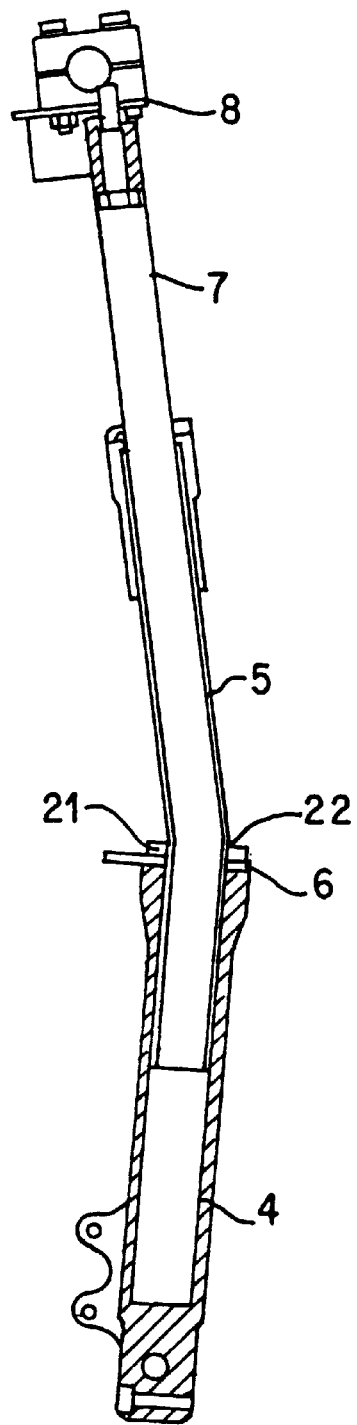
FIG. 7 is a sectional view of a deformed fork strut corresponding to the front wheel fork of FIG. 6.

FIG. 7 shows the front wheel fork of FIG. 6 in deformed condition. This sectional view shows that the vertical tube 7 projects in the direction of the axle receiving device 4 into this axle receiving device 4, specifically beyond the fork bridge 6. Thus, at a buckling point 22, i.e. the point of the maximal bending moment during deformation, the tube 5 is reinforced by the vertical tube 7. That is, both tubes (the tube 5 and the vertical tube 7) are deformed and thereby reduce kinetic energy.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Steerable axle suspension for a two-wheeler vehicle, comprising at least one tube assembly, at least one longitudinal control arm operatively mounted to be swivellable about a transverse axis of the two-wheeler vehicle, and a joint operatively connecting the at least one longitudinal control arm with the at least one tube assembly, wherein the tube assembly comprises at least one axle-receiving device for receiving a wheel axle of the two-wheeler vehicle and at least one tube within and lengthening the at least one axle-receiving device, wherein means is provides for weakening the at least one tube outside the axle-receiving device along at least a portion of a circumference of the at least one tube.

2. Steerable axle suspension according to claim 1, wherein the means comprises a notch or groove at the at least one tube.

3. Axle suspension according to claim 2, wherein the at least one tube is arranged to project into the axle receiving device to form a press fit therein, and a distance between the joint and the wheel axle measured along a longitudinal axis of the tube assembly is larger than a distance between an end of the at least one tube facing the axle-receiving device and the wheel axle.

4. Steerable axle suspension according to claim 1, wherein the means comprises weakened wall thickness of the at least one tube in proximity of the connection between the longitudinal control arm and the tube assembly.

5. Steerable axle suspension for a two-wheeler vehicle, comprising at least one tube assembly, at least one longitudinal control arm operatively mounted to be swivellable about a transverse axis of the two-wheeler vehicle, and a joint operatively connecting the at least one longitudinal control arm with the at least one tube assembly, wherein the tube assembly comprises at least one axle-receiving device for receiving a wheel axle of the two wheeler vehicle and at least one tube within and lengthening the at least one axle receiving device, wherein the at least one tube is arranged to project into the axle receiving device to form a press fit therein, and a distance between the joint and the wheel axle measured along a longitudinal axis of the tube assembly is larger than a distance between an end of the at least one tube facing the axle-receiving device and the wheel axle.

6. Steerable axle spring suspension for a two-wheeler vehicle, comprising at least one tube assembly, at least one longitudinal control arm operatively mounted to be swivellable about a transverse axis of the two-wheeler vehicle, and a joint operatively connecting the at least one longitudinal control arm with the at least one tube assembly, wherein the tube assembly comprises at least one axle-receiving device for receiving a wheel axle of the two wheeler vehicle and at least one tube within and lengthening the at least one axle receiving device, and a length of the at least one axle-receiving device and a length of overlap between the at least one axle-receiving device and associated one of the at least one tube are selected to predetermine deformation behavior of the at least one tube.

7. Steerable axle suspension according to claim 6, wherein the at least one tube comprises two built-up tube assemblies arranged to receive the wheel axle and connected by at least one fork bridge on which the longitudinal control arm is mounted.

8. Axle suspension according to claim 7, wherein the fork bridge is configured to connect the axle receiving devices.

9. Axle suspension according to claim 8, wherein the fork bridge is placed from above the two wheeler vehicle onto the axle receiving devices and is fastened thereto.

10. Axle suspension according to claim 7, wherein the fork bridge is configured to connect the tubes of the built-up tube assemblies.

11. Axle suspension according to claim 7, wherein the fork bridge comprises one of steel plate and a rolled or extruded sectional steel.

12. Steerable axle suspension according to claim 7, wherein the fork bridge is U-shaped, with each leg being fastened to respective ones of the tube assemblies.

13. Steerable axle suspension according to claim 6, wherein the at least one tube is made from one of steel material and an extruded light metal section.

14. Axle suspension according to claim 1, wherein the axle receiving device is a light-metal casting.

15. Steerable axle suspension for a two-wheeler vehicle, comprising at least one tube assembly, at least one longitudinal control arm operatively mounted to be swivellable about a transverse axis of the two-wheeler vehicle, and a joint operatively connecting the at least one longitudinal control arm with the at least one tube assembly, wherein the tube assembly comprises at least one axle-receiving device for receiving a wheel axle of the two-wheeler vehicle and at least one vertical tube fixedly connected within and lengthening the at least one axle receiving device, wherein the tube assembly is telescopically displaceably guided on the at least one vertical tube arranged to extend in a direction of the axle receiving device at least beyond the connection of the longitudinal control arm with the tube assembly.

16. A method of providing an axle suspension for a two-wheeler vehicle, comprising:

operatively mounting a longitudinal control arm swivellably about a transverse axis of the vehicle, connecting the longitudinal control arm with a tube assembly, having an axle-receiving device for receiving a wheel axle of the vehicle, a first tube having a lower end received on the axle-receiving device and a second tube slidable in an upper end of the first tube, and predetermining deformation behavior of the first tube by appropriate sizing of the axle-receiving device and a length of overlap between the axle-receiving device and the first tube.

* * * * *